Jan. 29, 1935.  A. T. SEWELL  1,989,295
LANDING SIGNAL
Filed July 27, 1929   2 Sheets-Sheet 1

INVENTOR
Arthur T. Sewell
BY Arthur C. Brown
ATTORNEY

Jan. 29, 1935.　　　A. T. SEWELL　　　1,989,295
LANDING SIGNAL
Filed July 27, 1929　　　2 Sheets-Sheet 2
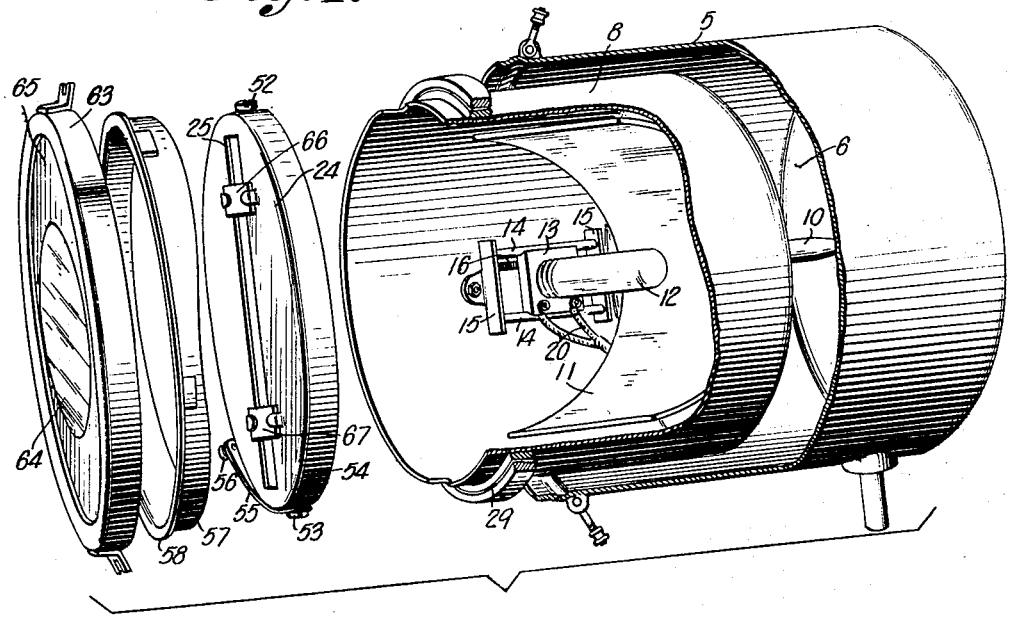
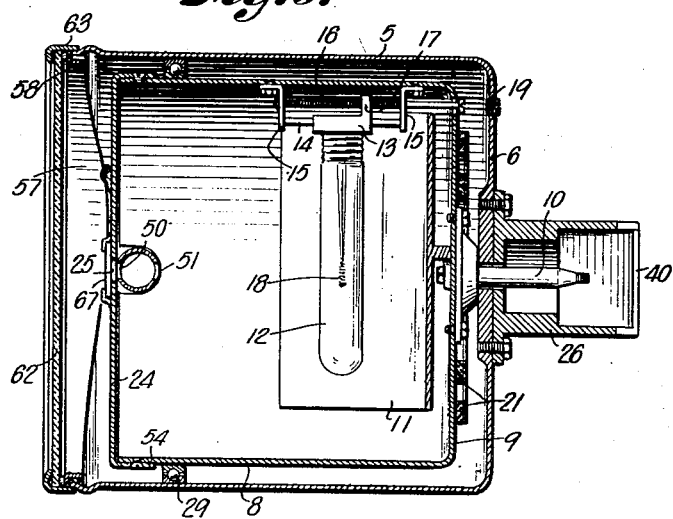
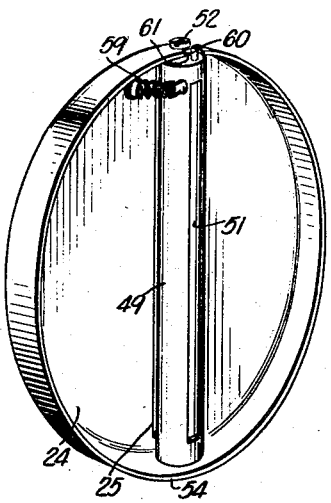
INVENTOR
Arthur T. Sewell
BY Arthur C. Brown
ATTORNEY Patented Jan. 29, 1935

1,989,295

UNITED STATES PATENT OFFICE 1,989,295

LANDING SIGNAL

Arthur T. Sewell, Edwardsville, Kans.

Application July 27, 1929, Serial No. 381,482

11 Claims. (Cl. 177—352)

My invention relates to illuminating devices, and more particularly to search lights for illuminating a strip of ground for guiding aviators using a landing field at night, the principal objects of the invention being to project a beam of light to a landing field to illuminate a relatively narrow landing path, to adjust the location of the beam on the field to the direction of air currents, and to effect adjustment of the beam responsively to changes in direction of the wind, so that an airplane may be landed or started into the wind within the beam.

Landing fields are illuminated throughout the entire landing area to facilitate night operations, and means independent of the field illuminating apparatus is employed for informing the pilots of the direction of air currents.

The illuminated wind-cone and illuminated weather-vane are the wind direction indicating instruments for night use now in common usage. Both of these instruments must necessarily be placed at some distance from the actual path of landing or take-off. During either of these operations, the pilot is unable to see the cone or vane, and therefore must estimate his path by memory of the last view he had of the instrument.

When flying to and from a field at night, enough of that field must be illuminated to allow a sufficiently large area for landing, should the wind change to any point of the compass. Theoretically, the portion of the field illuminated sufficiently for safe landing must include a circle of sufficient area that a plane can land within the length of its diameter.

Illuminating means such as a search light may be adapted to throw a beam on the field to illuminate an elongated strip, but the position of the beam on the ground can be shifted to lie parallel with air currents only by moving the source of light to new positions, or providing a multiplicity of sources of light.

Further objects of my invention therefore are to adapt a source of light mounted in fixed position for shifting a beam to illuminate a landing strip parallel with air currents, to assure parallelism between a beam and air currents, and to limit illumination of a landing field to a path of light suitable for landing or taking off and extending in the direction of the wind, and thus both lighting a landing area and informing the pilot of the true direction of the wind.

In accomplishing these and other objects of my invention, I have provided improved details of structure, the preferred forms of which are illustrated in the accompanying drawings, wherein:

Fig. 4 is a detail perspective view of the members for throwing and controlling a beam of light illustrated in separated position, the walls of a light housing, and a rotating drum in the housing being broken away to better show the internal construction.

Fig. 5 is a horizontal central section of the beam discharging and controlling apparatus in assembled position.

Fig. 6 is a perspective view of a slotted tube adapted to vary the width of the beam of light and the support for the tube.

Figure 1:
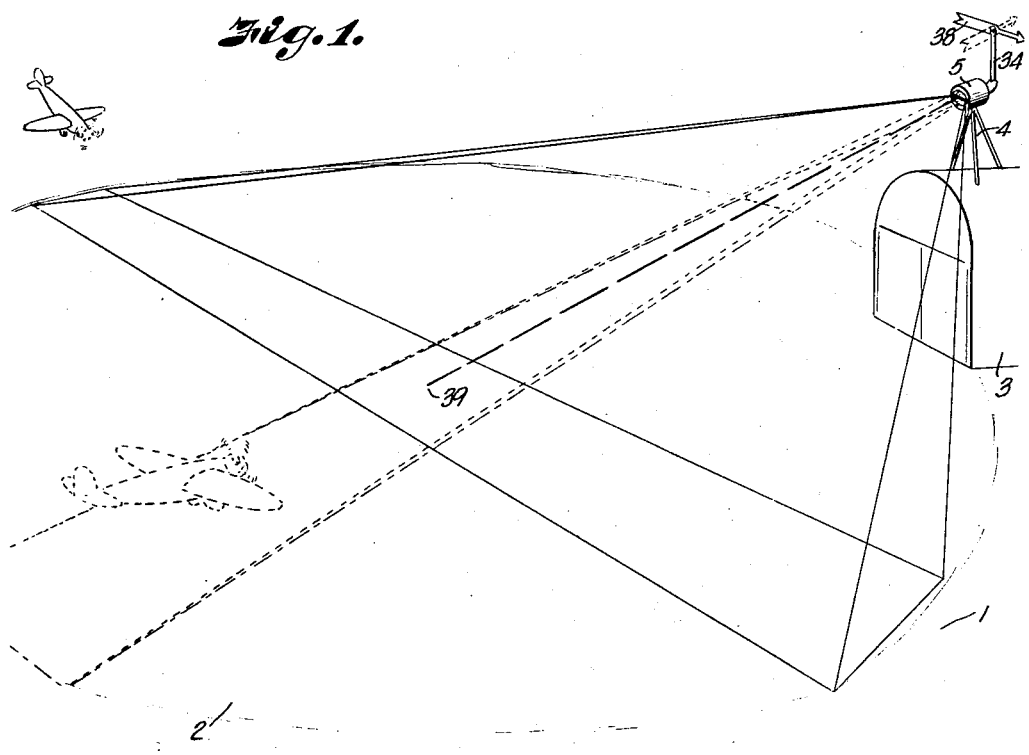
Fig. 1 is a partly perspective and partly diagrammatic view of a landing field and my improved landing signal illustrating the operation of the signal for illuminating paths extending angularly to each other.
Figure 2:
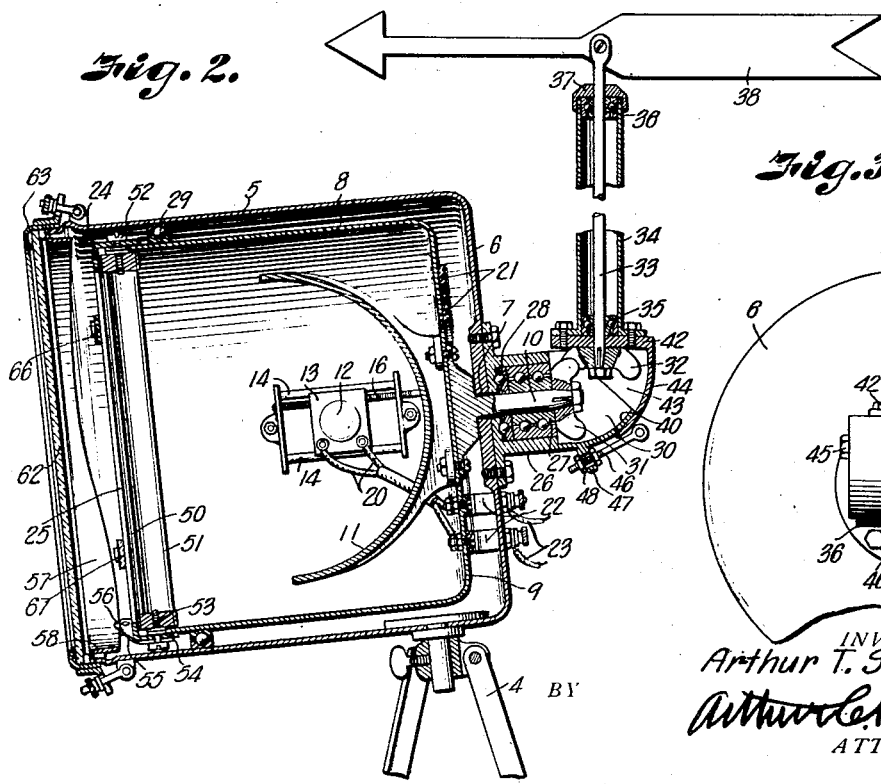
Fig. 2 is a vertical central section of the central operated signal apparatus, a weather vane pedestal and apparatus supporting tripod being shown fragmentarily.
Figure 3:
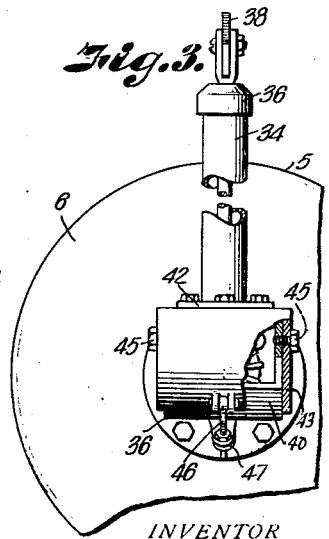
Fig. 3 is a rear view of the apparatus illustrating means for mounting the weather vane on the lighting member housing, the vane supporting column being shown fragmentarily, and a wall of the pivoting connection being broken away to show portions of the enclosed members.

Referring in detail to the drawings:

1 designates generally a landing field, 2 a circle defining the area within which landing or take-off must be accomplished, 3 a permanent structure such as a tower located on or adjacent the field and spaced from the area defined by the circle.

Mounted in fixed position on a support 4 such as a tripod on the tower is a cylindrical housing 5 having a rear wall 6 provided with an axial aperture 7. A drum 8 rotatable in the housing and coaxial therewith has a rear wall 9 provided with an axial shaft 10 extending through said opening 7.

A reflector 11 adapted to direct a stream of rays having substantially parallel sides is supported in the drum by an integral bracket fixed to the wall 9, and a source of light such as a light bulb 12 is mounted in a non-conductive base 13 having grooved sides engaging parallel rods 14 supported by spaced plates 15 fixed to the drum. The reflector is preferably semi-circular and the bulb is elongated and arranged parallel to the straight lines thereof to distribute the rays from the filament along the face of the reflector.

A screw 16 rotatably supported by the plates is threadedly engaged with apertured ears 17 in the base for shifting the bulb longitudinally in the drum toward and away from the apex of the reflector for focusing the filament 18 of the light bulb with reference to the reflector. The screw extends between an edge of the reflector and the drum as shown in Fig. 5, and its end projects through the drum wall 9'. An opening 19 is provided in the housing end wall for access to the screw for rotating the same to focus the light.

Conducting wires 20 connected with the filament have outer ends mounted in contact rings 21 fixed to the rear face of the wall 9 and insulated therefrom, and brushes 22 supported by and insulated from the end wall of the housing are connected with conductors 23 leading from a suitable source of current (not shown) whereby a circuit may be closed through the brushes, and rings for energizing the light while the drum is rotating as presently described.

Mounted at the front end of the drum is a disklike shield or front wall 24 having an elongated slot 25 extending substantially across the same on a diameter thereof and located at right angles to the axis on which the reflector is formed, for restricting the light from the light bulb to form a relatively narrow beam for illuminating a relatively long and narrow path to guide the aviator.

A fitting 26 secured to the end wall of the housing contains bearings for the shaft 10 including a race 27 fixed to the shaft and a thrust bearing ring 28, whereby the shaft is rotatably supported by the housing.

The front end of the drum is rotatably supported by bearings 29 comprising races engaged respectively to the housing and the drum, and balls mounted between the races.

The gear case 30 later particularly described is mounted at the outer end of the fitting and encloses a bevel gear 31 on the outer end of the shaft 10, and a bevel pinion 32 meshed with said gear and fixed on the lower end of a wind operated shaft 33 extending in a tube 34 attached to the upper end of the gear case. The shaft runs in bearings 35 and 36 in the tube, and a cap 37 attached to the shaft overlies the upper end of the tube for excluding dirt and weather effects therefrom. A weather vane 38 fixed to the protruding end of the shaft 33 is adapted to operate the shaft 10 for rotating the drum to revolve the narrow beam of light on the landing area.

The housing is adapted to be mounted in permanently fixed position and at a suitable inclination for so directing the beam that in any position the center of the beam will be at the center point 39 of the landing area. Different elevations of the housing on towers and pedestals of different character would require adjustment of the inclination of the light case. It is desirable to have the shaft 33 extend vertically and the vane 38 horizontally while the housing is inclined to throw the beam on the field in the manner just described.

Adjustment of the angular relation of the housing and vane shaft is provided for by forming an arcuate lower wall 40 and straight side wings projecting from the fitting, and mounting the tube 34 on a plate 42 having depending side wings 43 and an arcuate end wall 44 slidable over the wings and wall of the fitting, and pivotally connecting the fitting with the tube support by set screws 45 in related wings, whereby the weather vane portion of the gear case may be moved to establish the weather vane shaft in vertical position.

The two portions of the gear case are locked together by a screw 46 pivotally connected to the wall 44 and anchored adjustably in an apertured ear 47 on the fitting member wall 40 by nuts 48.

When the slot of the shield is in vertical position the beam of light will fall on the field on a diameter thereof aligned with the axis of the housing as illustrated in dotted lines in Fig. 1. When the slit is in horizontal position the beam of light will be spread out laterally and illuminate a strip of the field at right angles to the position of the first named beam on the field as indicated in solid lines in Fig. 1.

It is apparent that the beam will strike the ground at an acute angle when the slot is horizontal and the width of the beam on the ground will be much greater than in the case of the beam leaving the light bulb through the slot when vertically positioned.

It is desirable to modify the effective width of the slot so that the beam of light will be widened as it is revolved on the field and approaches a direction parallel to the principal axis of the housing, and will be narrowed as it approaches a position at right angles to the principal axis of the housing, and thus maintain a beam of light of uniform width when projected upon the ground.

I therefore locate a curtain comprising a slotted member, for example a tube 49 having longitudinal slots 50 and 51 to intercept the rays of light passing from the light bulb through the slot of the shield, and adapt the roller to be oscillated for varying the width of the beam of light.

The slots in the member 49 have substantially the same width as the slot in the shield and register with said slot when the slot is in vertical position.

The member 49 is preferably provided with spindles 52 and 53 for mounting the same rotatably in a flange 54, whereby the shield is attached to the drum, and is thus supported adjacent the slot in the shield.

In order to move the member 49, an arm 55 is rigidly attached to one of the spindles exteriorly to the drum and provided with a grooved wheel 56 projecting forwardly from the face of the shield. The wheel runs on a fixed cam track comprising the rim 57 of an annulus 58 mounted at the end of the housing.

The track is formed eccentrically, having an arcuate face curving away from the face of the shield at intermediate vertical positions. A spring 59 attached to the member 49 and anchored to the shield tends to urge the grooved wheel into engagement with the track and thus keep the wheel in contact with the face of the track.

As the member 49 turns from the position in which the slots thereof both register with the slot of the shield, portions of the member 49 at opposite edges of the slots intercept light and block the same from opposite sides of the slit, thus symmetrically reducing the effective width of the slit, and retaining the center line of the beam in the center line of the slit.

The roller is turned by small degrees upon rotation of the drum so that the path for the beam of light is automatically restricted and widened for maintaining a beam of light of uniform width on the ground as the beam is revolved over the field.

A lug 60 projecting from one end of the member 49 operates in a slot 61 in the edge of the shield flange to stabilize the movement of the member 49 and limit its rotation under impulse conferred by the rotative movement of the shield.

A glass lens 62 is mounted on the outer end of the housing in a flanged annulus 63 and passage of light through the lens is confined to an elliptical transparent portion or area 64 formed by covering the major portion of the lens with opaque material 65 to block the passage of light except through the elliptical area.

The transparent area is elongated horizontally and has substantially the length of the shield slot so that when the shield slot is positioned vertically the upper and lower portions of the elongated beam passing through the slot are blocked by the opaque portions of the lens, and when the slot is positioned horizontally and the beam is narrowed by the slotted member 49, the entire beam is permitted to pass through the lens.

I further provide for coloring the end portions of a beam differentially, preferably by mounting portions of red glass 66 in the drum at the end of the member 49 related to the arrow of the vane, and green glass 67 at the other end. The beam will thus inform the aviator that the wind is blowing over the illuminated path from the red toward the green end thereof.

In using the invention, the apparatus is mounted on the highest available point adjacent the landing field and the housing is secured in fixed tilted position for throwing a beam on the area having the center point at the center of the field around which the beam may be revolved. The weather vane shaft is adjusted to vertical position. When the wind influences the weather vane so that its arrow points in the direction from which the wind is blowing, the shaft 33 effects rotation of the lamp drum to throw a beam extending parallel with the wind.

When the wind direction is parallel to the axis of the housing 5 and drum 8, and is blowing either toward the signal or from it, the weather vane will operate the drum to position the shield slot vertically and project an elongated beam in a position on the field parallel with the wind direction.

Slight changes in wind direction will effect rotative movement of the drum to shift the position of the beam on the field while retaining the axis of the beam and the center point thereof in the center of the field. However abrupt the wind changes may be and however extensive the change, the apparatus will respond promptly to project a beam on the field that will illuminate a narrow landing or take-off path parallel with the wind direction. The slotted member 49 will be operated automatically to control the width of the beam for defining the path accurately.

While aviators ordinarily will be able to realize whether the wind is blowing in one or the other direction along the path, the means for coloring one or both ends of the illuminated path gives clearly observable information on the direction of the wind.

The invention is thus adapted for casting a relatively narrow beam of light on a dark field to illuminate a strip of ground within which an airplane may operate, differently coloring opposite ends of the beam by means of colored screens, and effecting relocation of the plane of the beam synchronously with changes of direction of air currents. The rays of light from a suitable source may be formed into a sheet or stream, the plane in which the beam extends may be controlled and changed, and the coloring of portions of the beam may be differentiated, for any desired purpose, for example to form traffic or other signal on an illuminated surface other than an aircraft landing field.

What I claim and desire to secure by Letters Patent is:

1. In combination with a landing field, a landing signal including an elevated support, a light source carried by the support for directing a beam of light toward a predetermined point on the field, means adjustable about the axis of said beam for defining a strip of light extending on the landing field through said point, means for positioning the defining means to project the strip of light selectively through said point in different directions, means cooperating with said defining means for maintaining substantially constant dimensions of the strip of light projected upon the field, and means movable with the defining means for directing an identifying beam at one end of the strip of light.

2. In combination with a landing field, a landing signal including an elevated support, a light source carried by the support for directing a beam of light toward a predetermined point on the field, means adjustable about the axis of said beam for defining a strip of light extending on the landing field through said point, means for positioning the defining means to project the strip of light selectively through said point in different directions, and means cooperating with said defining means for maintaining substantially constant dimensions of the strip of light projected upon the field.

3. In combination with a landing field, a landing signal including a light source, means for supporting said light source in an elevated position at one side of the field to direct a beam of light toward a predetermined point on the field, a slotted shield, means rotatably supporting the slotted shield in the path of the light beam to define a strip of light extending on the landing field through said point, means for rotating the shield to change angularity of the slot relatively to the plane of the field whereby the position of said strip of light is rotated about said point in different directions, and means responsive to movement of the shield for varying the effective width of the slot to maintain a substantially constant area of said light strip regardless of the angular position of the slot relatively to the plane of the field.

4. In combination with a landing field, a landing signal including an elevated support, a housing on said support, a source of light in the housing to direct a beam of light toward a predetermined point on the field, a shield rotatably mounted relatively to the housing and having a slot through which the beam of light is projected to define a definite shaped light area upon the field, means for rotating the shield to vary angularity of the slot relatively to the plane of the field whereby the position of said light area is caused to move about said point in different directions, and means responsive to rotation of the shield for varying effective width of said slot to maintain dimension of said light area substantially constant regardless of the angular position of the slot relatively to the plane of the field.

5. In combination with a landing field, a landing signal including an elevated support positioned adjacent one side of the field, a housing on the support, a light source in the housing for directing a beam of light toward a predetermined point on the field, a shield rotatably mounted relatively to the housing and having a slot through which the beam of light is projected to define a definite shaped light area upon the field, means having fixed mounting relatively to the housing, a driving connection between said fixed means and the shield whereby the shield is rotated to vary angularity of the slot relatively to the plane of the field whereby the position of said light area is caused to move about said point in different directions, and means responsive to rotation of the shield for varying effective width of said slot to maintain dimensions of said light area substantially constant regardless of the angular position of the slot relatively to the plane of the field.

6. In combination with a landing field, a landing signal including an elevated support mounted adjacent one side of the field, a housing on the support, a reflector in the housing having a semi-cylindrical concave reflecting surface, a shield in the housing in front of the reflector having an elongated slot at right angles to the axis on which the reflector is formed, a light source between the reflector and the shield for directing a beam of light through the slot to form a light area on a predetermined point of the field, means for rotatably mounting the reflector and the shield in the housing, means for simultaneously rotating the reflector and shield to vary angularity of the slot relatively to the plane of the field whereby the position of the light area on the field is changed about said point as a center, and means responsive to rotation of the shield for automatically varying the effective area of said slot for maintaining substantially constant dimensions of the light area upon the field.

7. In combination with a landing field, a landing signal including an elevated support, a housing having an open side and mounted on said support, a tubular member rotatably mounted in the housing adjacent its open end at right angles to the axis of the housing and having diametrically spaced longitudinal slots, means in the housing for directing light rays toward said tubular member for projection through the slots thereof to define a strip of light extending through a predetermined point on the field, means for rotating said tubular member in the housing on a transverse axis, and means for rotating said tubular member on its longitudinal axis simultaneously with rotation thereof on its transverse axis to maintain dimensions of said light strip substantially constant regardless of rotational position of the tubular member relatively to said transverse axis.

8. In combination with a landing field, a landing signal including an elevated support, a housing having an open side and mounted on said support, a tubular member rotatably mounted in the housing adjacent its open end at right angles to the axis of the housing and having diametrically spaced longitudinal slots, means in the housing for directing light rays toward said tubular member for projection through the slots thereof to define a strip of light extending through a predetermined point on the field, means for rotating said tubular member in the housing on a transverse axis, means for rotating said tubular member on its longitudinal axis simultaneously with rotation thereof on its transverse axis to maintain dimensions of said light strip substantially constant regardless of rotational position of the tubular member relatively to said transverse axis, and means movable with said tubular member for defining colored light beams at the ends of said strip.

9. In combination with a landing field, a landing signal including a light source, means for supporting said light source in elevated position at one side of the field to direct a beam of light toward a predetermined point on the field, a slotted shield, means rotatably supporting the slotted shield in the path of the light beam to define a strip of light extending on the landing field through said point, means for rotating the shield to change angularity of the slot relatively to the plane of the field whereby the position of said strip of light is rotated about said point in different directions, a tubular member having diametrically positioned slots, means for mounting the tubular member in alignment with the slot in said shield, and means for rotating said tubular member responsive to rotation of the shield for varying the effective width of the shield slot to maintain a substantially constant area of said light strip regardless of angular position of the shield slot relatively to the plane of the shield.

10. In combination with a landing field, a landing signal including an elevated support, a light source carried by the support for directing a beam of light toward a predetermined point of the field, means adjustable about the axis of said beam for defining a strip of light extending on the landing field through said point, means responsive to direction of air currents moving across said field for positioning the defining means to project a strip of light selectively through said point, means supported in the path of said beam of light to define a different colored light area adjacent the ends of said strip, and means cooperating with said defining means for maintaining substantially constant dimensions of the strip of light projected upon the field.

11. In combination with a landing field, a landing signal including a light source, means for supporting said light source in an elevated position at one side of the field to direct a beam of light toward a predetermined point of the field, a slotted shield, means rotatably supporting the slotted shield in the path of the light beam to define a strip of light extending on the landing field through said point, a pair of colored lenses positioned over the ends of said slot for defining colored light areas at the ends of the strip of light, means for rotating the shield to change angularity of the slot relatively to the plane of the field whereby the position of said strip of light is rotated about said point, and means responsive to movement of the shield for varying the effective width of the slot to maintain a substantially constant area of said light strip regardless of the angular position of the slot relatively to the plane of the field.

ARTHUR T. SEWELL.